US012107670B2

(12) United States Patent
Nandiraju et al.

(10) Patent No.: US 12,107,670 B2
(45) Date of Patent: Oct. 1, 2024

(54) CONTAINER BASED TIME DIFFERENTIALS

(71) Applicant: Comcast Cable Communications, LLC, Philadelphia, PA (US)

(72) Inventors: Nagesh Nandiraju, Willow Grove, PA (US); Robert Gaydos, Harleysville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/397,706

(22) Filed: Apr. 29, 2019

(65) Prior Publication Data

US 2020/0343988 A1    Oct. 29, 2020

(51) Int. Cl.
| H04J 3/06 | (2006.01) |
| H04L 7/00 | (2006.01) |
| H04L 7/04 | (2006.01) |
| H04W 56/00 | (2009.01) |

(52) U.S. Cl.
CPC .......... *H04J 3/0661* (2013.01); *H04L 7/0033* (2013.01); *H04L 7/04* (2013.01); *H04W 56/001* (2013.01)

(58) Field of Classification Search
None
See application file for complete search history.

(56) References Cited

U.S. PATENT DOCUMENTS

| 7,873,077 | B2 |  | 1/2011 | Downey et al. |
| 9,063,769 | B2 | * | 6/2015 | Damola ............. G06F 11/3466 |
| 9,075,648 | B2 | * | 7/2015 | Kruglick ............. H04L 43/0852 |
| 9,094,308 | B2 | * | 7/2015 | Ghose ................. H04L 43/0852 |
| 9,141,132 | B2 | * | 9/2015 | Chandra ................... H04L 7/00 |
| 9,164,535 | B2 | * | 10/2015 | Chandra .................... G06F 1/12 |
| 9,344,265 | B2 | * | 5/2016 | Karnes ................ H04L 12/4641 |
| 9,401,856 | B2 | * | 7/2016 | Magee .................. H04J 3/0667 |
| 9,497,720 | B2 | * | 11/2016 | Bar Bracha ......... H04W 56/001 |
| 9,548,833 | B2 | * | 1/2017 | Bui ........................ H04J 3/0667 |
| 9,794,220 | B2 |  | 10/2017 | Ong et al. |
| 9,805,193 | B1 | * | 10/2017 | Salsamendi ........... G06F 21/562 |
| 9,888,475 | B2 |  | 2/2018 | Wolcott et al. |
| 9,954,731 | B2 |  | 4/2018 | Siripunkaw et al. |
| 9,998,247 | B1 | * | 6/2018 | Choudhury ........... H04J 3/0685 |
| 10,057,916 | B2 | * | 8/2018 | Barabell ............. H04B 17/318 |
| 10,165,534 | B2 | * | 12/2018 | Bilstad ................ H04W 56/001 |
| 10,349,368 | B2 | * | 7/2019 | Bilstad .................. H04L 7/0012 |
| 10,505,651 | B1 | * | 12/2019 | Garrett .................. H04J 3/0682 |
| 2013/0340020 | A1 |  | 12/2013 | Urban et al. |
| 2015/0263965 | A1 |  | 9/2015 | Liu |
| 2015/0295669 | A1 |  | 10/2015 | Chapman et al. |

(Continued)

OTHER PUBLICATIONS

Abdul Aziz Reehan Shaik, "Clock Synchronization in Distributed Systems Using NTP and PTP," Wayne State University, Winter 2016.

(Continued)

*Primary Examiner* — Alpus Hsu
(74) *Attorney, Agent, or Firm* — Banner & Witcoff, Ltd.

(57) ABSTRACT

Systems, apparatuses, and methods are described for synchronization based on time differentials in an access network. A time domain may be established for a virtual service and a remote node. The virtual service may synchronize to a clock associated with the remote node based on a time differential. Various virtual services may maintain their own time domains with remote nodes.

25 Claims, 7 Drawing Sheets

(56) References Cited

U.S. PATENT DOCUMENTS

| | | | | |
|---|---|---|---|---|
| 2016/0112182 | A1* | 4/2016 | Karnes | G06F 1/14 375/362 |
| 2016/0277272 | A1* | 9/2016 | Peach | H04L 43/0858 |
| 2016/0359711 | A1* | 12/2016 | Deen | H04L 63/1433 |
| 2017/0149660 | A1* | 5/2017 | Shu | H04L 47/28 |
| 2018/0095997 | A1* | 4/2018 | Beveridge | H04L 67/10 |
| 2018/0227067 | A1* | 8/2018 | Hu | H04J 3/0641 |
| 2019/0238229 | A1* | 8/2019 | Chapman | H04B 10/25751 |
| 2020/0169972 | A1* | 5/2020 | Marce | H04L 47/283 |
| 2020/0336426 | A1* | 10/2020 | Tadimeti | H04L 43/16 |

OTHER PUBLICATIONS

CableLabs, "Data-Over-Cable Service Interface Specifications DOCSIS 3.1, MAC and Upper Layer Protocols Interface Specification, CM-SP-MULPIv3.1-116-180926," Sep. 26, 2018.

CableLabs, "Data-Over-Cable Service Interface Specifications DOCSIS 3.1, Physical Layer Specification, CM-SP-PHYv3.1-I12-171026," Oct. 26, 2017.

CableLabs, "Data-Over-Cable Service Interface Specifications DCA-MHAv2, Remote Downstream External PHY Interface Specification, CM-SP-R-DEPI-I11-180926," Sep. 26, 2018.

CableLabs, "Data-Over-Cable Service Interface Specifications DCA-MHAv2, Remote DOCSIS Timing Interface, CM-SP-R-DTI-I04-170111," Jan. 11, 2017.

CableLabs, "Data-Over-Cable Service Interface Specifications DCA-MHAv2, Remote Out-of-Band Specification, CM-SP-R-OOB-I10-180926," Sep. 26, 2018.

CableLabs, "Data-Over-Cable Service Interface Specifications DCA-MHAv2, Remote PHY Specification, CM-SP-R-PHY-111-180926," Sep. 26, 2018.

Ajay Gummalla, "DOCSIS Overview," Broadcom, Ethernet in the First Mile Study Group, Jul. 2001.

Belal Hamzeh, Jennifer Andreoli-Fang, "DOCSIS Technologies for Mobile Backhaul," CableLabs Technical Brief, May 2018.

Himanshu Arora, "Intro to DOCSIS Architecture, CM CMTS Protocol for Cable Modems," The Geek Stuff, https://www.thegeekstuff.com/2012/05/docsis-introduction/, May 11, 2012.

Greg White, "IPoC: A New Core Networking Protocol for 5G Networks," Inform[ed] Blog CableLabs, https://www.cablelabs.com/ipoc-a-new-core-networking-protocol-for-5g-networks, Oct. 29, 2018.

Symmetricom, "NTP and PTP (IEEE 1588) A Brief Comparison," 2010.

VIAVI Solutions, "Remote PHY Architectures: Operational Challenges and Opportunities," 2018.

Cisco, "Remote PHY for Converged DOCSIS, Video, and OOB White Paper," caa560b2-4a33-4a33-87b1-536eaddb9e02, https://www.cisco.com/c/en/us/solutions/collateral/service-provider/converged-cable-access-platform-ccap-solution/white-paper-c11-732260.html, May 30, 2018.

Cisco, "RPHY Video Overview," Sep. 20, 2017.

Hang Jin, Yubin Chen, "Time Schemes in Remote PHY Architecture," Cisco Systems, 2015 Spring Technical Forum Proceedings, Spring 2015.

Hsueh-szu Yang, Benjamin Kupferschmidt, "Time Stamp Synchronization in Video Systems," Teletronics Technology Corporation, 2010.

Ulrich Kohn, "Timing in Digitized Cable Networks," ADVA Optical Networking, https://blog.advaoptical.com/en/timing-in-digitized-cable-networks, Jun. 23, 2017.

Yair Neugeboren, "Timing Needs in Cable Networks," ARRIS, 2017.

Juniper Networks, "Virtual Converged Cable Access Platform Architectures," GAINSPEED, 2015.

Nokia Networks, "Virtualize your CCAP," https://networks.nokia.com/solutions/unified-cable-access, 2018.

Arris, "Virtualized CCAP," 2017.

Lili Hervieu, "Wireless RF Spectrum Scarcity, What About Light Wave?" Inform[ed] Blog CableLabs, https://www.cablelabs.com/wireless-rf-spectrum-scarcity-what-about-light-wave, Dec. 5, 2018.

* cited by examiner

CONTAINER BASED TIME DIFFERENTIALS

BACKGROUND

In an access network, a core network may implement one or more virtual services. The virtual services may communicate with remote nodes to carry out various functions of the access network. The virtual services and the remote nodes may stay in synchronization. As the number of virtual services and/or remote nodes increases, inefficient synchronization architectures may lead to higher consumption of resources, and/or may impede the scalability of the system.

SUMMARY

The following summary presents a simplified summary of certain features. The summary is not an extensive overview and is not intended to identify key or critical elements.

Systems, apparatuses, and methods are described for synchronization based on time differentials in an access network. A virtual service may synchronize to a clock associated with a remote node. The synchronization may be based on a time differential associated with a time domain for the virtual service and the remote node. The time differential may be determined based on the clock associated with the remote node and a clock associated with a computing device by which the virtual service is implemented. Virtual services may maintain their own time domains with remote nodes, for example, by keeping track of their time differentials. Maintenance of time domains for virtual services may reduce reliance on external master clocks and/or facilitate scaling.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
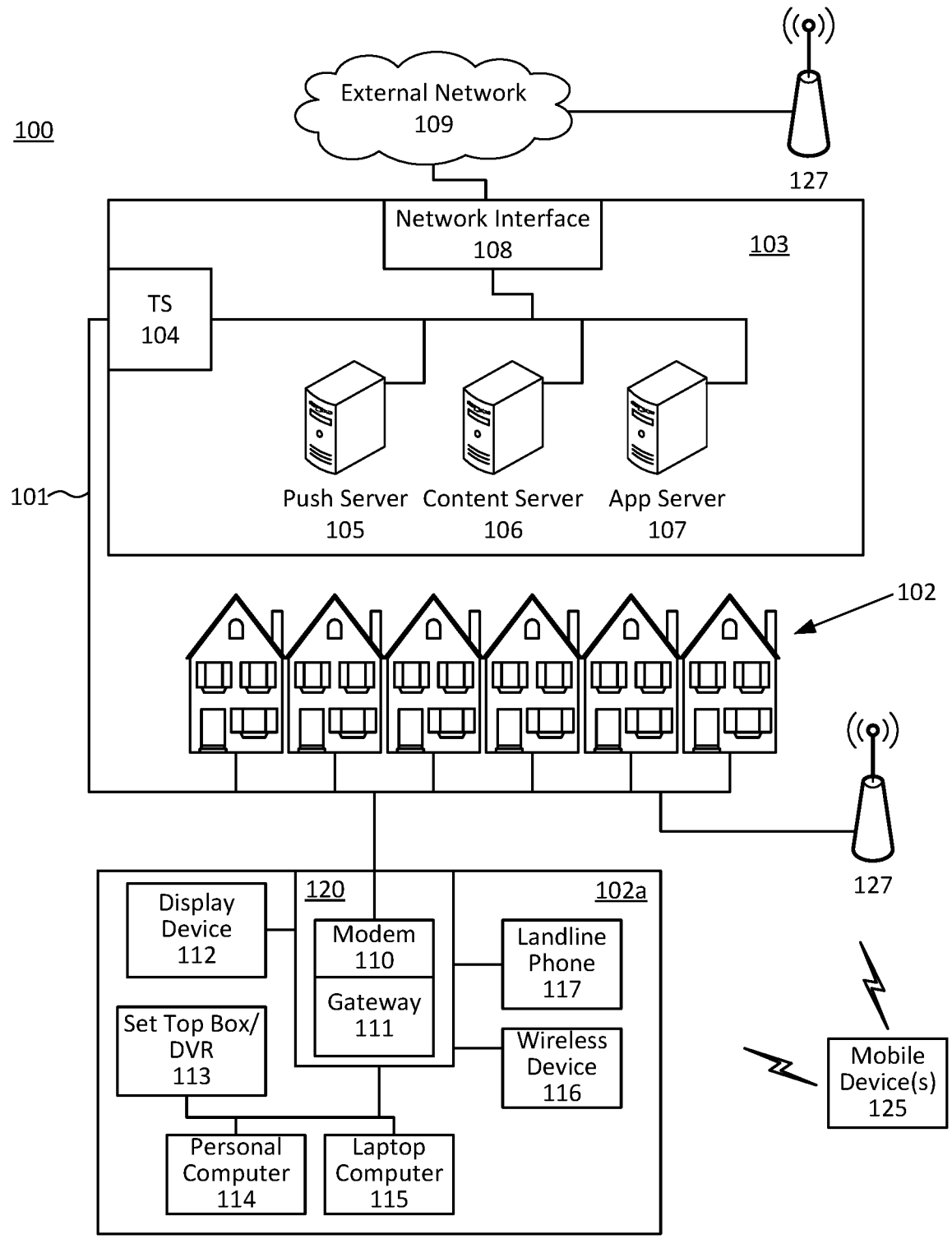
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
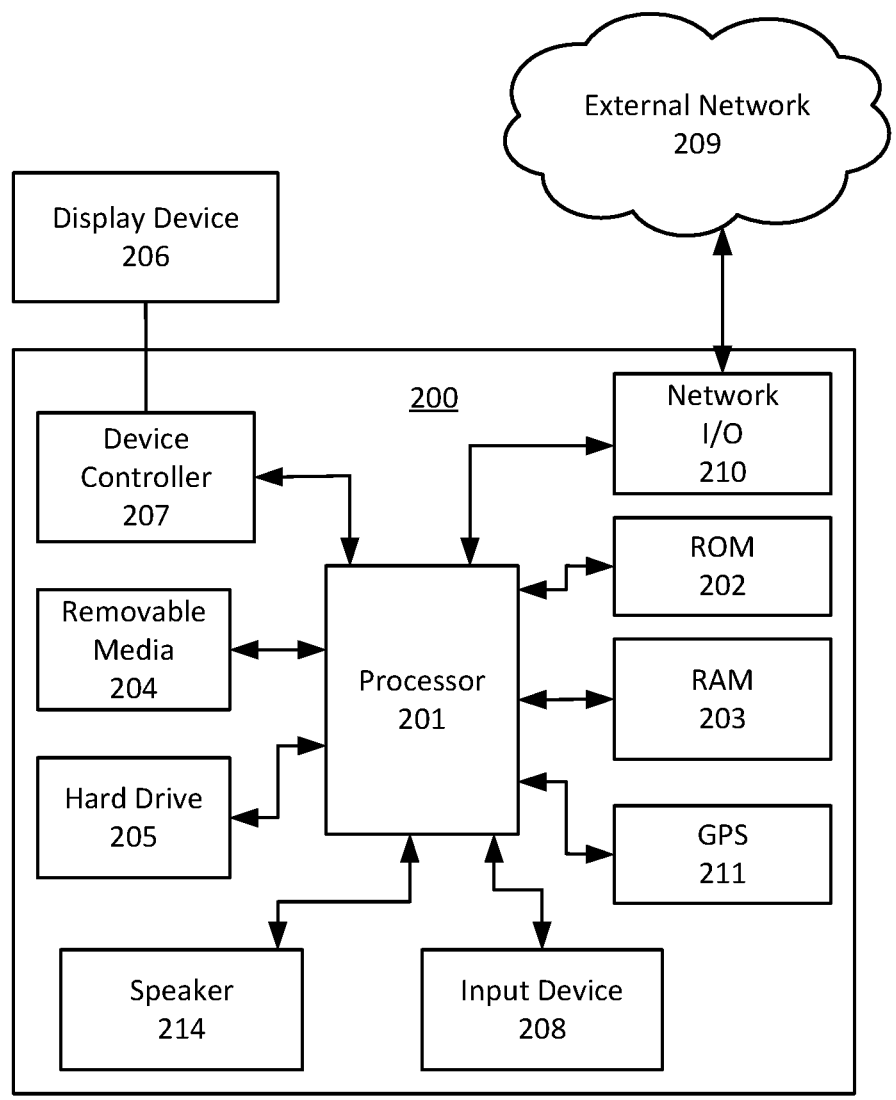
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., any devices associated with an external network 301, any devices of a content source 303, any devices of a core network 305, a termination system 307, any of content engines 309, 405, any of remote nodes 311A-311C, any of gateways 313A-313C, any of user devices 315A-315C, any of servers 401A-401B). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
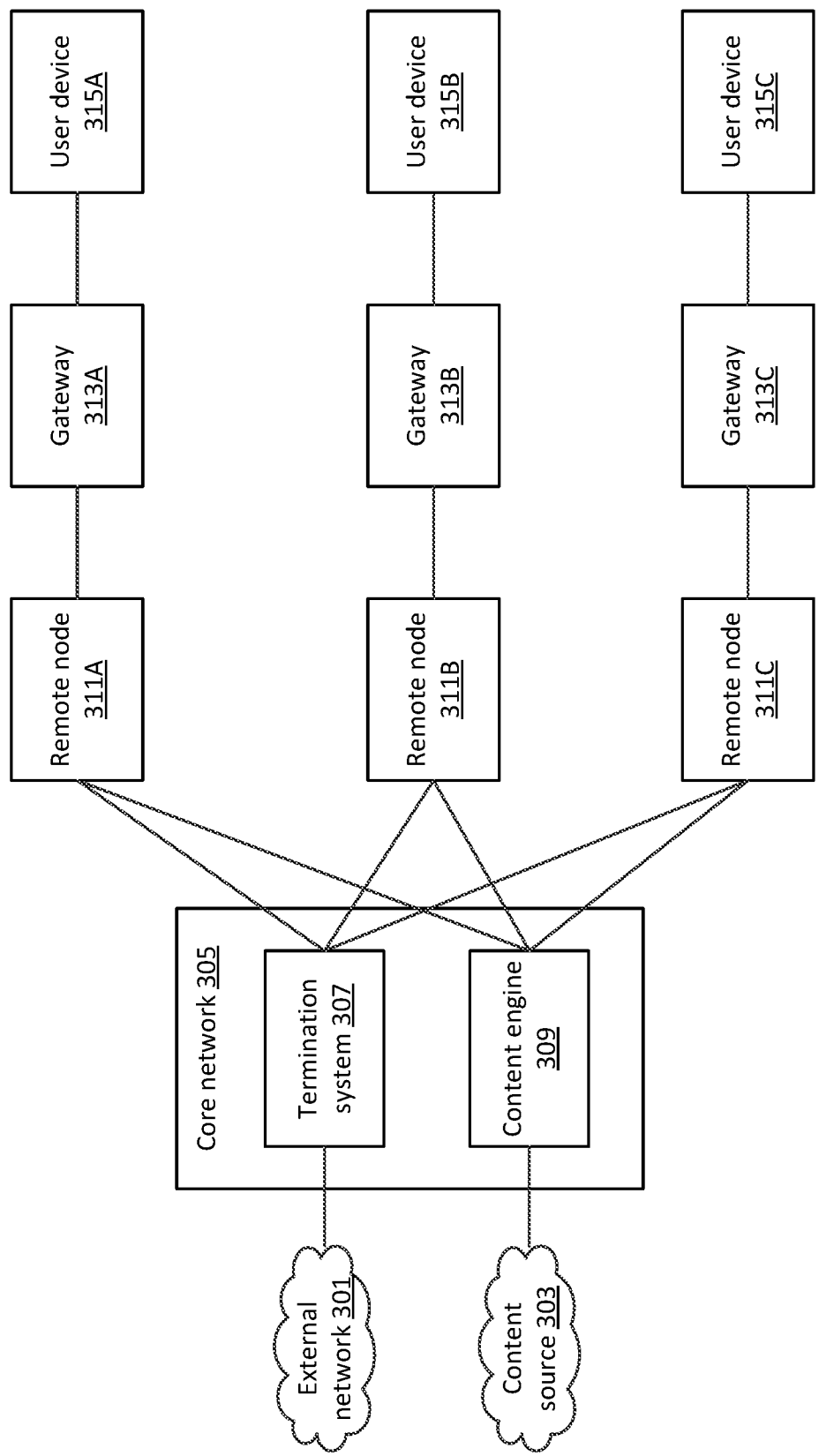
FIG. 3 is a diagram showing an example system in which features described herein may be implemented.

FIG. 3 is a diagram showing an example system in which features described herein may be implemented. The system may comprise one or more external networks (e.g., external network 301), one or more content sources (e.g., content source 303), one or more core networks (e.g., core network 305), one or more remote nodes (e.g., remote nodes 311A-311C), one or more gateways (e.g., gateways 313A-313C), and one or more user devices (e.g., user devices 315A-315C).

A user device of the user devices 315A-315C may comprise, for example, a smartphone, a cell phone, a mobile communication device, a personal computer, a server, a tablet, a desktop computer, a laptop computer, a gaming device, a virtual reality headset, or any other type of computing device. Additionally or alternatively, a user device may comprise one or more of the devices 112-117, 125, the computing device 200, and/or other types of computers or devices.

The external network 301 may comprise a single network or a collection of multiple connected networks. The external network 301 may comprise, for example, the external network 109, the external network 209, networks of Internet devices, telephone networks, wireless networks, fiber optic networks, or any other desired network. The external network 301 may comprise an Internet Protocol (IP) based network (e.g., the Internet). The content source 303 may comprise, for example, the content server 106, or any other device(s) configured to provide content. The content provided may comprise, for example, video, audio, text, web pages, images, files, etc.

The core network 305 may comprise one or more computing devices performing one or more operations such as are described herein. The core network 305 may be configured to manage connectivity between the user devices 315A-315C and the external network 301 (e.g., the Internet) via the gateways 313A-313C and the remote nodes 311A-311C, and/or may be configured to manage delivery of content (e.g., video) from the content source 303 to the user devices 315A-315C via the remote nodes 311A-311C and the gateways 313A-313C.

The core network 305 may comprise, for example, the local office 103, a headend, a Converged Cable Access Platform (CCAP) Core, etc. Additionally or alternatively, the core network 305 may comprise an Evolved Packet Core (EPC), the fifth generation wireless systems (5G) Core Network, or any other type of core network. The core network 305 may communicate with the remote nodes 311A-311C, the external network 301, and/or the content source 303 via any type of communication link, such as an IP-based communication link.

Example components of the core network 305 (e.g., a CCAP Core) are shown in FIG. 3. The core network 305 may comprise one or more termination systems (e.g., termination system 307) and one or more content engines (e.g., content engine 309). The content engine 309 may be configured to manage delivery of content from the content source 303 to the user devices 315A-315C via the remote nodes 311A-311C and the gateways 313A-313C. The content engine 309 may comprise, for example, an Edge QAM (EQAM) for delivering content.

The termination system 307 may comprise, for example, the interface 104 and/or a cable modem termination system (CMTS). The termination system 307 may be configured to manage connectivity between the user devices 315A-315C and the external network 301 (e.g., the Internet) via the gateways 313A-313C and the remote nodes 311A-311C. For example, the termination system 307 may establish a tunnel, between a user device and the external network 301, via the termination system 307, remote nodes, and gateways, so that packets from user devices may be placed on the external network 301 and/or packets from the external network 301 may be delivered to user devices.

The remote nodes 311A-311C may be located at different locations separated from the core network 305. The remote nodes 311A-311C may be connected to the termination system 307 and/or the content engine 309 via any type of communication link, such as Ethernet (e.g., optical Ethernet), fiber, etc. The remote nodes 311A-311C may implement various physical (PHY) layer functions of the termination system 307 and/or the content engine 309. For example, the remote nodes 311A-311C may convert (e.g., modulate) data received from the termination system 307 and/or the content engine 309 into radio frequency signals, and may send the radio frequency signals to the gateways 313A-313C. The remote nodes 311A-311C may comprise, for example, remote PHY devices (RPDs). Additionally or alternatively, the remote nodes 311A-311C may comprise any type of radio frequency access network remote unit, such as a distributed unit of a 5G cloud radio access network (Cloud RAN).

The gateways 313A-313C may be configured to convert (e.g., demodulate) radio frequency signals received from the remote nodes 311A-311C into digital data. A gateway of the gateways 313A-313C may comprise, for example, the interface 120, the modem 110, the gateway 111, a cable modem (CM), etc. The gateways 313A-313C may be, for example, located at user locations. The gateways 313A-313C may send the converted digital data to the user devices 315A-315C via any type of communication link, such as a wireless communication link, an Ethernet communication link, etc. Additionally or alternatively, a gateway of the gateways 313A-313C may comprise a wireless device, such as a mobile phone acting as a hot spot.

The termination system 307 and/or the content engine 309 may be implemented on servers of the core network 305, for example, as one or more virtual services (e.g., supported by hypervisors and/or other types of virtual service managers of the servers using virtualization technology). Each virtual service may be configured to perform the functions of the termination system 307, and may be connected to, and/or communicate with, one or more remote nodes. A hypervisor (or virtual machine manager) may, for example, comprise processes that may be executed by processor(s) of physical server(s) (e.g., in a datacenter). A virtual service manager (e.g., a hypervisor) may be configured to configure (e.g., create) and/or manage virtual services (e.g., virtual machines). For example, a hypervisor may provide virtual resources (e.g., virtual disks, virtual processors, virtual memory, etc.) to operating systems and/or control processes of the virtual services in any manner that simulates the operation systems and/or control processes having direct access to system resources (e.g., physical disks, physical processors, physical memory, etc.).

A virtual service (e.g., a virtual machine) may comprise a set of executable instructions that, when executed by one or more processors, may imitate the operation of a physical computing device such that the virtual service may execute processes like a physical computing device. A virtual service may comprise virtual resources (e.g., virtual disks, virtual processors, virtual memory, etc., provided by a hypervisor). Various processes (e.g., operating systems, applications, functions of the termination system 307, etc.) may be implemented by a virtual service. Configuring the termination system 307 and/or the content engine 309 as virtual services may improve the flexibility of the system, as virtual services may be dynamically configured or removed (for example, using hypervisors) to satisfy changing network demands.

Figure 4:
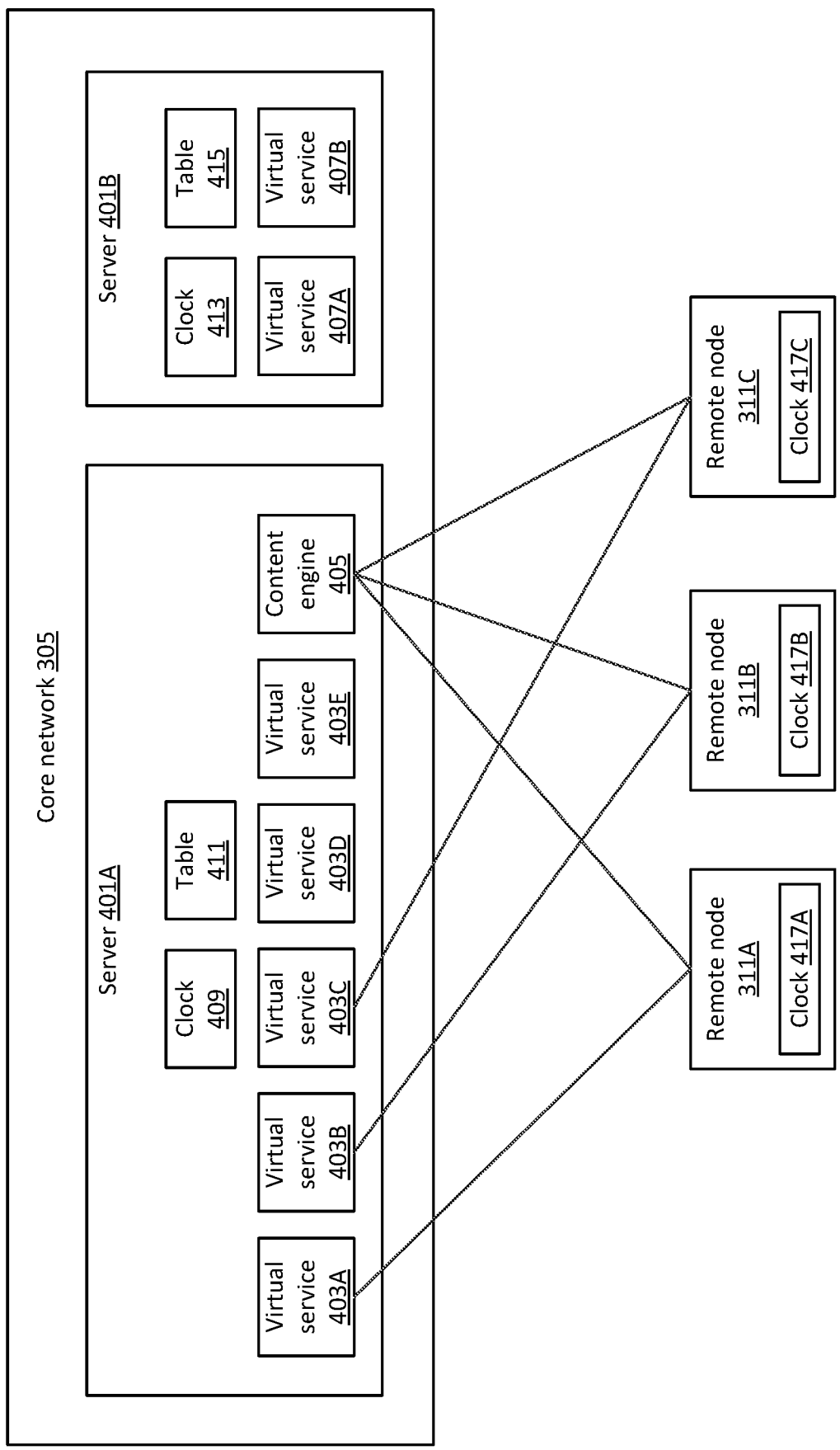
FIG. 4 is a diagram showing an example system for synchronization in a container based access network.

FIG. 4 is a diagram showing an example system for synchronization in a container based access network. In a container based access network, network functions may be virtualized (e.g., implemented as virtual services). The system may comprise the core network 305 and the remote nodes 311A-311C. The core network 305 may comprise one or more servers (e.g., servers 401A-401B). A server of the servers 401A-401B may comprise any type of computing device. One or more virtual services may be implemented on the server. For example, virtual services 403A-403E may be implemented on the server 401A, and virtual services 407A-407B may be implemented on the server 401B. The virtual services 403A-403E, 407A-407B may comprise, for example, virtual machines or any other computing container configured to implement one or more functions of the core network 305. For example, the virtual services 403A-403E, 407A-407B may comprise virtual CMTSs (vCMTSs). The virtual services 403A-403E, 407A-407B may, for example, be managed by one or more virtual service managers (e.g., one or more of any type of hypervisor or virtual machine manager, such as a bare-metal hypervisor, a hosted hypervisor, etc.).

One or more content engines may be implemented on servers of the core network 305. For example, a content engine 405 may be implemented on the server 401A. Content engines may be implemented on other servers of the core network 305. The content engine 405 may comprise, and/or may be configured to perform the functions of, the content engine 309. The content engine 405 may be implemented as any type of software running on the server 401A.

Each remote node (e.g., RPD) of the remote nodes 311A-311C may be associated with a virtual service (e.g., a vCMTS). For example, the remote node 311A may be associated with the virtual service 403A, the remote node 311B may be associated with the virtual service 403B, and the remote node 311C may be associated with the virtual service 403C. A remote node and an associated virtual service may together carry out the functions of an access network protocol stack (e.g., a CMTS protocol stack). The remote node may implement some components of the access network protocol stack, and the virtual service may implement some other components of the access network protocol stack. For example, the remote node may implement some or all of the physical layer functions, and the virtual service may implement some or all of the media access control (MAC) layer or upper layer functions.

One or more remote nodes may be associated with a content engine. For example, the remote nodes 311A-311C (e.g., RPDs) may be associated with the content engine 405. The content engine 405 may send (e.g., broadcast, narrowcast, or unicast) digital content streams (e.g., MPEG transport streams) to the remote nodes 311A-311C (e.g., via optical Ethernet communication links). The remote nodes 311A-311C may modulate the digital content streams into radio frequency signals, and may send the radio frequency signals to various gateways (e.g., at user locations).

The server 401A may comprise a clock 409. The server 401B may comprise a clock 413. The remote node 311A may comprise a clock 417A. The remote node 311B may comprise a clock 417B. The remote node 311C may comprise a clock 417C. A clock of the clocks 409, 413, 417A-417C may comprise, for example, an oscillator (e.g., a crystal oscillator) or a timestamp counter driven by the oscillator. For example, the value of the clock (e.g., a timestamp counter) may increment at a particular frequency (e.g., increment by one (1) every one (1) microsecond).

The clocks 409, 413, 417A-417C may run at similar (e.g., same or slightly different) frequencies. For example, the frequencies of the clocks 409, 413, 417A-417C may be within a 10 Hz range around 10.24 MHz. The clock frequencies may change slightly over time (e.g., 1 Hz per hour). The clocks 409, 413, 417A-417C may have same or different current phases (e.g., timestamp counter values). For example, the current value of one clock may be 1,034,234, and the current value of another clock may be 30,324.

The remote nodes 311A-311C, the virtual services 403A-403C, and/or the content engine 405 may keep in synchronization in order to implement various functions. For example, a virtual service (e.g., a vCMTS) may implement MAC layer functions, and may generate an Upstream Bandwidth Allocation Map message (MAP message). The virtual service may send the MAP message to a remote node, and the remote node may send the MAP message to a gateway. The gateway may be synchronized to a clock of the remote node. The MAP message may indicate a timestamp according to the clock of the remote node, may instruct the gateway to send a message back to the remote node when a clock of the gateway increments to the value of the indicated timestamp, and may be used for determining a time offset between the clock of the remote node and the clock of the gateway. If the virtual service does not have knowledge of the clock of the remote node, the virtual service might not be able to include a correct timestamp in the MAP message.

Additionally or alternatively, a remote node may comprise a buffer (e.g., in the structure of a queue) for storing content data (e.g., MPEG transport stream data) received from a content engine. The remote node may periodically read data from the buffer, may modulate the read data into radio frequency signals, and may send the radio frequency signals to gateways. The remote node may read data from the buffer based on a clock of the remote node (e.g., read 10 kilobytes of data from the buffer every time the timestamp counter of the remote node clock increments by one (1)). The content engine may send data to the buffer of the remote node (e.g., periodically based on the content engine's clock). If the content engine does not have knowledge of the clock of the remote node (e.g., if the content engine's clock runs at a higher or lower frequency than the remote node's clock), the content engine might not be able to send data to the buffer of the remote node at a proper speed, and it may contribute to causing buffer overflow or buffer starvation at the remote node.

To implement various functions, remote nodes, virtual services, and content engines may keep in synchronization. As the quantity of the components increases and the system scales, inefficient synchronization architectures may lead to higher consumption of resources, and/or may impede the scalability of the system. For example, extra resources may be needed to implement external grand master clocks to synchronize the components. Using a server clock to synchronize remote nodes could result in a need to implement components associated with those remote nodes on the same server.

Establishing individual time domains for remote nodes and their corresponding virtual services may help avoid and/or alleviate these and/or other issues. The time domains may be independent from each other. A time domain may comprise a virtual service and a remote node. The remote node may comprise the master of the time domain, and the virtual service may synchronize to the clock of the remote node. The virtual service may determine (and/or update), based on a clock of the server on which the virtual service is implemented, a time differential to the clock of the remote node. The virtual service may derive a clock of the time domain (e.g., a logical clock) based the time differential, and may send data to the remote node accordingly. A table of time differentials associated with the time domains may be generated. The time differential table may be used by a content engine for sending data to remote nodes, used for configuring backup virtual services, and/or used for other purposes.

For example, the virtual service 403A may synchronize to the clock 417A of the remote node 311A by keeping track of a time differential associated with a time domain comprising the virtual service 403A and the remote node 311A. The time differential may be determined based on one or more synchronization messages indicating one or more timestamps. More details regarding determining a time differential are discussed in connection with FIG. 5. The time differential may allow the virtual service 403A to translate the clock 409 of the server 401A on which the virtual service 403A is implemented into a clock of the time domain (e.g., a logical clock). For example, the clock of the time domain may indicate, to the virtual service 403A, an expected timestamp value, of the clock 417A, when a message currently sent by the virtual service 403A is received by the remote node 311A. For example, if the current value of the clock of the time domain is 1,000,001, and the virtual service 403A concurrently sends a message to the remote node 311A, the value of the clock 417A may be 1,000,001 when the message is received by the remote node 311A. The virtual services 403B, 403C may similarly synchronize respectively to the clocks 417B, 417C by keeping track of their time differentials.

The server 401A may comprise a time differential table 411. The server 401B may comprise a time differential table 415. The following shows an example of the time differential table 411. The table may indicate additional and/or alternative records. Table 415 may have a similar format and/or contain similar information.

| Time domain | Time differential |
|---|---|
| 403A-417A | 131,231,143 |
| 403B-417B | 432,934 |
| 403C-417C | 2,423,412 |

The table may comprise one or more types of data fields, such as time domain data fields and time differential data fields. The time domain data fields may store indicators of time domains. The indicators may comprise any value that uniquely indicates the time domain. For example, an indicator may be based on an identifier of the virtual service of the time domain, an identifier of the remote node of the time domain, a combination of the two, etc. The time differential data fields may store values of the time differentials associated with corresponding the time domain. For example, one time domain data field and time differential data filed pair indicates that a time differential associated with the time domain 403B-417B may be 432,934.

The time differential table may be used by a content engine for sending data to remote nodes, used for configuring backup virtual services, and/or used for other purposes. For example, the content engine 405 may use the information in the time differential table 411 to determine clocks of the time domains associated with the remote nodes 311A-311C, and may schedule content data to be sent to the remote nodes 311A-311C based on the clocks of the time domains (e.g., to avoid buffer overflow or buffer starvation at the remote nodes 311A-311C).

The virtual services 403D-403E of the server 401A may be used as backups for the virtual services 403A-403C. A backup virtual service may be used to support one or more active virtual services. The virtual services 403D-403E may use the information in the time differential table 411 for configuration. For example, if a failure of a virtual service of the virtual services 403A-403C is detected, a virtual service of the virtual services 403D-403E may be configured to take over the functions previously performed by the failed virtual service (e.g., to communicate with the corresponding remote node). The time differential associated with the time domain of the failed virtual service may be obtained from the time differential table 411. The backup virtual service may be configured with the obtained time differential, and may use the obtained time differential for communicating with the remote node previously associated with the failed virtual service.

Additionally or alternatively, the virtual services 407A-407B of the server 401B may be used as backups for the virtual services 403A-403C. A backup virtual service may be used to support one or more active virtual services. The virtual services 407A-407B may use the information in the time differential table 415 for configuration. For example, one or more time differentials associated with time domains comprising the remote nodes 311A-311C may be determined (and/or updated) based on the clock 413 of the server 401B, and may be stored in the time differential table 415. If a failure of a virtual service of the virtual services 403A-403C is detected, a virtual service of the virtual services 407A-407B may be configured to take over the functions previously performed by the failed virtual service (e.g., to communicate with the corresponding remote node). The time differential associated with the remote node of the failed virtual service may be obtained from the time differential table 415. The backup virtual service may be configured with the obtained time differential, and may use the obtained time differential for communicating with the remote node previously associated with the failed virtual service. Additionally or alternatively, each backup virtual service configured to support multiple active virtual services may determine, update, and/or maintain a time differential of a remote node associated with each of the active virtual services. If a backup virtual service takes over the functions of a failed virtual service, the backup virtual service may use the time differential of the remote node associated with the failed virtual service. A new backup virtual service may be configured and may gather the time differentials for its supported active virtual services (e.g., in response to and/or after the employed backup virtual service taking over the functions of the failed virtual service). The new backup virtual service may be implemented on a server same as, or different from, the server on which the failed virtual service and/or the employed backup virtual service may be implemented. More details regarding synchronization based on time differentials are further discussed in connection with FIGS. 6A-6B.

Figure 5:
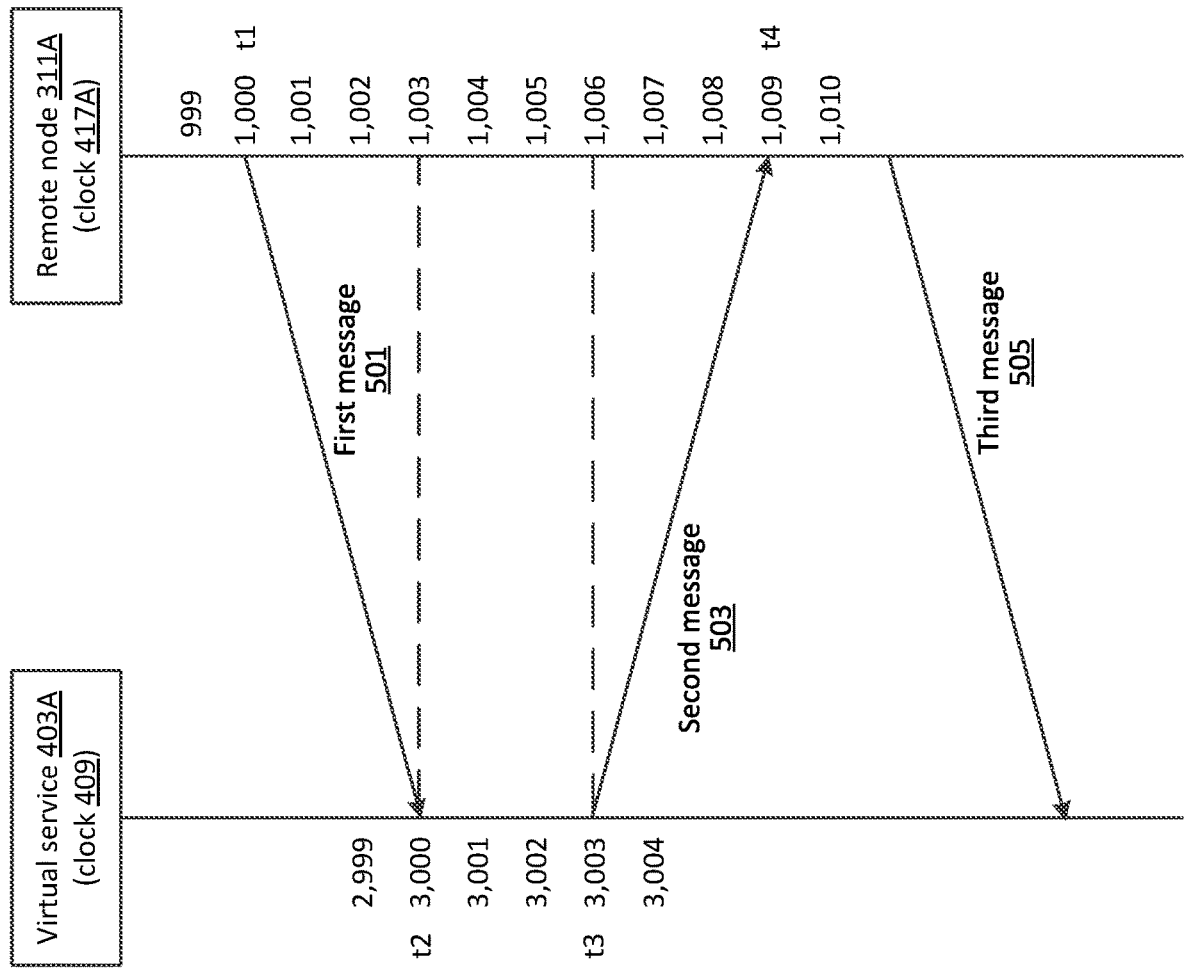
FIG. 5 is a diagram showing an event sequence associated with an example method for synchronizing a virtual service to a remote node.

FIG. 5 is a diagram showing an event sequence associated with an example method for synchronizing a virtual service to a remote node. The order of the steps may be altered without departing from the scope of the disclosure provided herein. Although the event sequence is described as being performed by a particular arrangement of computing systems, devices, and/or networks (e.g., the virtual service 403A and the remote node 311A), the processes may be performed by a greater or smaller number of computing systems, devices, and/or networks, and/or by any type of computing system, device, and/or network.

In step 501, the remote node 311A may send, to the virtual service 403A, a first message. The first message may initiate a synchronization process between the remote node 311A and the virtual service 403A, and may be triggered periodically, for example, by the remote node 311A, by the virtual service 403A, and/or by other computing devices. The remote node 311A may measure the time of sending the first message (e.g., a timestamp t1). The timestamp t1 may be determined by software or hardware based on the clock 417A of the remote node 311A. The timestamp t1 may be sent to the virtual service 403A, for example, by including the timestamp t1 in the first message and/or in another message to be sent to the virtual service 403A. The virtual service 403A may receive the first message, and may measure the time of receiving the first message (e.g., a timestamp t2). The timestamp t2 may be determined by software or hardware based on the clock 409 of the server 401A on which the virtual service 403A is implemented.

In step 503, the virtual service 403A may send, to the remote node 311A, a second message. The virtual service 403A may measure the time of sending the second message (e.g., a timestamp t3). The timestamp t3 may be determined by software or hardware based on the clock 409 of the server 401A on which the virtual service 403A is implemented. The remote node 311A may receive the second message, and may measure the time of receiving the second message (e.g., a timestamp t4). The timestamp t4 may be determined by software or hardware based on the clock 417A of the remote node 311A. In step 505, the remote node 311A may send, to the virtual service 403A, a third message. The third message may indicate, for example, the timestamp t4 and/or the timestamp t1.

The virtual service 403A may receive the third message. The virtual service 403A may determine a time differential associated with the time domain comprising the virtual service 403A and the remote node 311A, for example, based on the timestamps t1, t2, t3, and t4. The time differential may, for example, correspond to (t1−t2)+((t4−t1)−(t3−t2)), wherein (t1−t2) may represent that the clock 409 (used by the virtual service 403A) at t2 may have a different value than the clock 417A of the remote node 311A at t1, and ((t4−t1)−(t3−t2)) may represent the time spent for traversing the network between the virtual service 403A and the remote node 311A.

The virtual service 403A may determine, based on the time differential, a clock of the time domain comprising the virtual service 403A and the remote node 311A. For example, the clock of the time domain may correspond to the incrementing value of the clock 409, of the server 401A on which the virtual service 403A is implemented, plus the time differential. The clock of the time domain may indicate, to the virtual service 403A, an expected timestamp value, of the clock 417A, when a message currently sent by the virtual service 403A is received by the remote node 311A. For example, if the timestamp t1 is 1,000, the timestamp t2 is 3,000, the timestamp t3 is 3,003, and the timestamp t4 is 1,009, the time differential may be −1,994. If the virtual service 403A sends, to the remote node 311A, a message at timestamp 3,100 according to the clock 409, the virtual service 403A may determine that the message may be received by the remote node 311A at timestamp 1,106 according to the clock 417A.

Additionally or alternatively, the virtual service 403A may determine the time differential of time domain comprising the virtual service 403A and the remote node 311A based on the timestamps t3 and t4. For example, the time differential may correspond to t4−t3 (which may equal to (t1−t2)+((t4−t1)−(t3−t2))). For example, if the virtual service 403A sends a message at timestamp t3 according to the clock 409 and the message is received by the remote node 311A at timestamp t4 according to the clock 417A, the virtual service 403A may assume that messages sent afterward may have a similar timestamp correspondence. To determine the time differential, the virtual service 403A may send, to the remote node 311A, a message, and may measure a first timestamp of sending the message based on the clock 409. The remote node 311A may receive the message, and may measure a second timestamp of receiving the message based on the clock 417A. The remote node 311A may send, to the virtual service 403A, the measured second timestamp. The virtual service 403A may determine, based on the measured first timestamp and the measured second timestamp as received from the remote node 311A, the time differential. The time differential may correspond to the measured second timestamp minus the measured first timestamp. Additionally or alternatively, the virtual service 403A may be synchronized to the remote node 311A, and/or may determine the time differential, in various other manners, such as using the Precision Time Protocol (PTP) or the Network Time Protocol (NTP). Additionally or alternatively, the deltas in the time differential between sending and receiving may be based on (a) the distance between the sender and the receiver and (b) the medium via which a signal is sent between the sender and the receiver, and the accuracy and/or efficiency of the time differential determination may be augmented by data collected that yield both parameters (a) and (b). For example, if the communication link between a server and a remote node is an optical fiber, the distance between the server and the remote node and the time length that a light signal may take to propagate through the optical fiber may be determined using an optical time-domain reflectometer (OTDR). The determined time length may be added to or subtracted from the time differential determination. For example, if the determined time length is T, the time differential may correspond to (t1−t2)+2T. This may increase the accuracy and/or efficiency of the time differential determination.

Figure 6A:
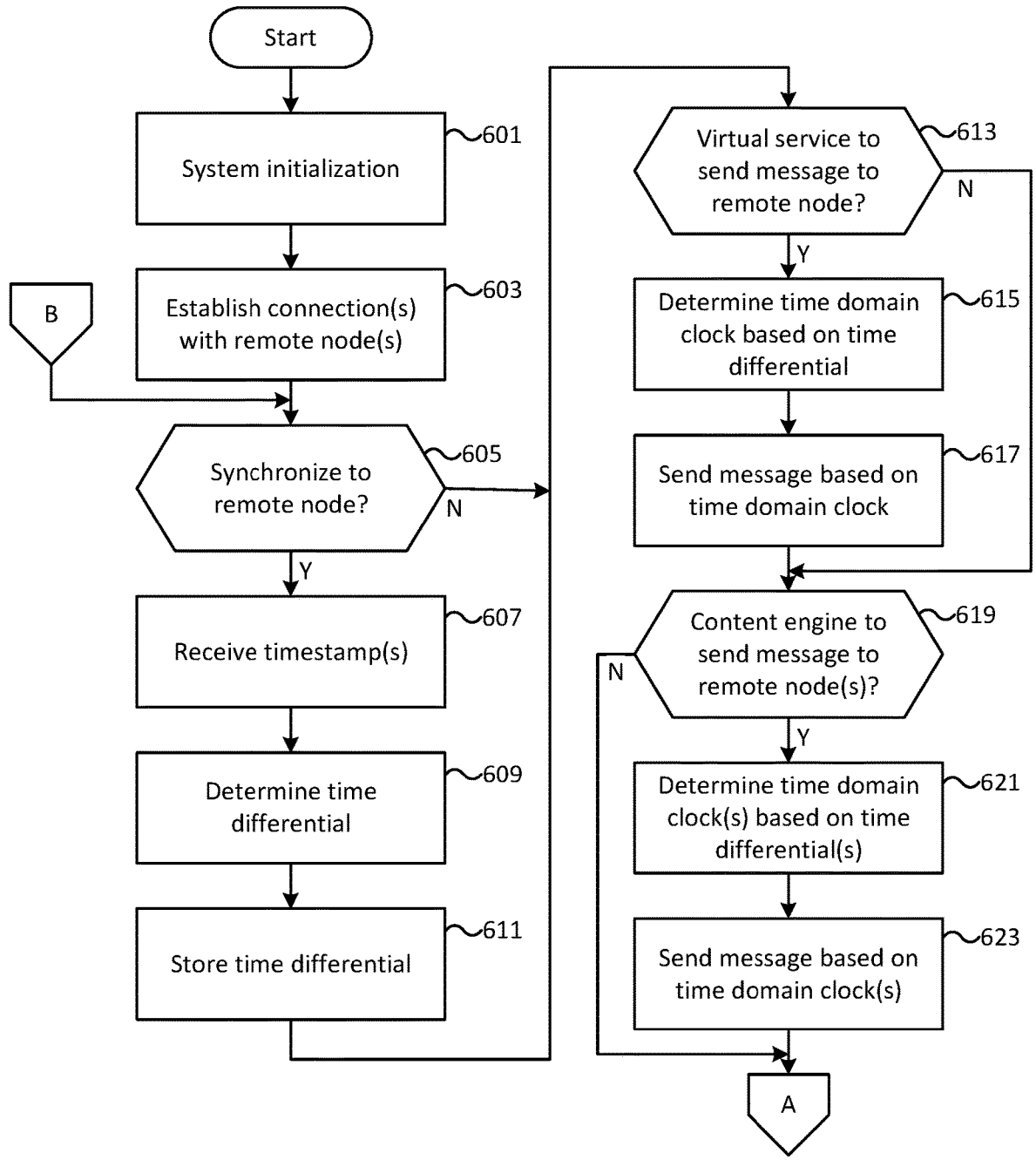
FIGS. 6A-6B are a flowchart showing an example method for synchronization in an access network.
Figure 6B:
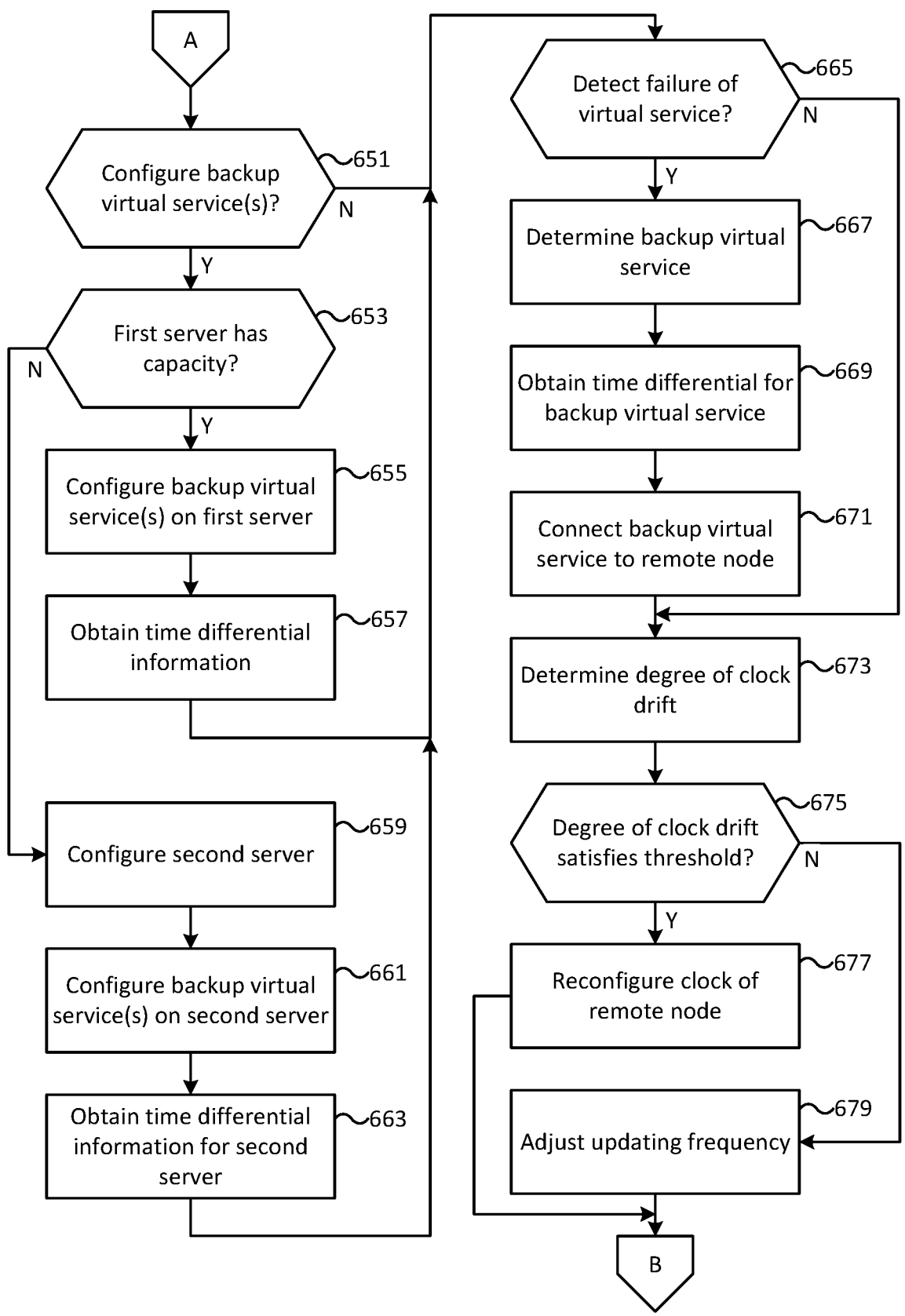

FIGS. 6A-6B are a flowchart showing an example method for synchronization in an access network. The method may be performed, for example, by the system as discussed in connection with FIGS. 3-4 (e.g., the core network 305, the remote nodes 311A-311C, the servers 401A-401B, the virtual services 403A-403E, 407A-407B, the content engine 405, etc.). The steps of the method may be described as being performed by particular components and/or computing devices for the sake of simplicity, but the steps may be performed by any component and/or computing device, or by any combination of one or more components and/or one or more computing devices.

In step 601, system initialization may be conducted. The system initialization may comprise a core network and remote nodes coming online (e.g., initially connected, powered on, etc.). For example, servers in the core network may be initialized, virtual services may be configured on the servers, and a content engine may be instantiated on the servers. The remote nodes may initialize radio frequency circuitry (e.g., quadrature amplitude modulation (QAM) modulators, etc.) for communicating with gateways (e.g., the gateways 313A-313C). The virtual services (e.g., vCMTSs) may establish connections with the external network 301. The content engine may, for example, establish connections with the content source 303.

In step 603, one or more connections between one or more virtual services and one or more remote nodes may be established. A virtual service (e.g., a vCMTS) may establish a connection with a remote node (e.g., a RPD). The connection may comprise any type of communication link, such as an Ethernet (e.g., optical Ethernet) link, a fiber link, a logical link over an IP-based network, etc. The remote node may be configured as the master of a clock domain comprising the remote node and the virtual service. Additionally or alternatively, one or more connections may be established between the content engine and the remote nodes.

In step 605, a determination of whether to synchronize a virtual service to a corresponding remote node (e.g., to determine a time differential) may be made. For example, a virtual service may synchronize to a corresponding remote node after a connection between them is established. A virtual service may periodically synchronize to a corresponding remote node (e.g., at an updating frequency). For example, a timer for a next synchronization session may be set, and the remote node and the virtual service may synchronize if the timer has expired. A remote node and a virtual service may synchronize if an issue related to inadequate synchronization (e.g., an incorrect timestamp indicated in a MAP message, buffer overflow at a remote node, buffer starvation at a remote node, etc.) has been detected.

If a virtual service is to synchronize to a corresponding remote node (step 605: Y), the method may proceed to step 607. In step 607, the virtual service may receive one or more timestamps from the remote node. For example, the virtual service may send a first message to the remote node, and may measure a first timestamp of sending the first message based on a clock of the server on which the virtual service is implemented. The remote node may receive the first message, and may measure a second timestamp of receiving the first message based on a clock of the remote node. The remote node may send, to the virtual service, a second message indicating the measured second timestamp. The second message may indicate the first message and/or any other indicator, so that the virtual service may associate the two messages, and/or may associate the two timestamps, for purposes of further processing (e.g., comparing the two timestamps and/or determining a time differential). The clock of the server and the clock of the remote node may run at similar frequencies (e.g., within a 10 Hz range around 10.24 MHz).

In step 609, a time differential associated with a time domain comprising the virtual service and the remote node may be determined. For example, the virtual service may determine, based on the measured first timestamp and the measured second timestamp as received from the remote node, the time differential. The time differential may correspond to the second timestamp minus the first timestamp. Additionally or alternatively, the virtual service may determine the time differential in a similar manner as described in connection with FIG. 5, and/or in various other manners, such as using the Precision Time Protocol or the Network Time Protocol.

In step 611, the time differential as determined in step 609 may be stored in the virtual service, and/or in a database table independent of (e.g., outside of) the virtual service. For example, the virtual service may be associated with a corresponding virtual storage, and may store the determined time differential in the virtual storage. The server (e.g., the server 401A) on which the virtual service is implemented may comprise a time differential table (e.g., the time differential table 411). The time differential table may be, for example, configured independent of (e.g., located outside of) the virtual service. A time differential table may also be implemented independent of (e.g., outside of) the server. The time differential as determined in step 609 may be sent by the virtual service to the time differential table, and/or may be extracted (e.g., by the server) and stored to the time differential table (e.g., in a record corresponding to the time domain comprising the virtual service and the remote node).

One or more other virtual services (e.g., implemented on the same server as the virtual service) may synchronize to their corresponding remote nodes, and one or more time differentials associated with time domains comprising the other virtual services and their corresponding remote nodes may be determined and/or stored, in a similar manner as described above. Additionally or alternatively, a server (e.g., implementing a content engine and/or virtual services) may keep track of time differentials associated with remote nodes connected to the server, and may store the time differentials in its time differential table (e.g., for use by a content engine and/or virtual services implemented on the server).

If a virtual service is not to synchronize to a corresponding remote node (step 605: N), the method may proceed to step 613. In step 613, a determination of whether a virtual service is to send one or more messages to a remote node associated with the virtual service may be made. For example, a virtual service may be configured to periodically send, to a remote node, MAP messages directed to a gateway. If a virtual service is to send one or more messages to a remote node associated with the virtual service (step 613: Y), the method may proceed to step 615. In step 615, the virtual service may determine, based on its time differential and the clock of the server on which the virtual service is implemented, a clock of the time domain comprising the virtual service and the corresponding remote node. The clock of the time domain may correspond to the clock of the server plus the time differential. For example, if the clock of the server comprises a timestamp counter incrementing at a particular frequency, the clock of the time domain may correspond to the incrementing value of the timestamp counter plus the time differential.

In step 617, the virtual service may send one or more messages based on the determined clock of the time domain comprising the virtual service and the corresponding remote node. For example, the virtual service (or the MAC layer functions implemented on the virtual service) may generate a MAP message based on the clock of the time domain. A future timestamp of the clock of the time domain may be included in the MAP message. The MAP message may be sent to the remote node, which may send the MAP message to a gateway. The gateway may be synchronized to the clock of the remote node. The MAP message may instruct the gateway to send a message back to the remote node if the clock of the gateway increments to the value of the future timestamp.

If a virtual service is not to send one or more messages to a remote node associated with the virtual service (step 613: N), the method may proceed to step 619. In step 619, a determination of whether a content engine is to send one or more messages to one or more remote nodes associated with the content engine may be made. For example, a content engine may be configured to periodically send, to one or more remote nodes, content data directed to gateways.

If a content engine is to send one or more messages to one or more remote nodes associated with the content engine (step 619: Y), the method may proceed to step 621. In step 621, the content engine may determine, based on time differentials associated with the one or more remote nodes and the clock of the server on which the content engine is implemented, the clocks of time domains comprising the remote nodes. The content engine may obtain the time differentials associated with the one or more remote nodes from a time differential table of the server. The clocks of the time domains may correspond to the clock of the server plus the respective time differentials associated with the remote nodes. For example, if the clock of the server comprises a timestamp counter incrementing at a particular frequency, the clocks of the time domains may correspond to the incrementing value of the timestamp counter plus the respective time differentials.

In step 623, the content engine may send one or more messages based on the determined clocks of the time domains. For example, the content engine may determine the amount of content data to be sent to each of the remote nodes associated with the content engine. Each remote node associated with the content engine may comprise a buffer for storing content data (e.g., MPEG transport stream data). Content data received from the content engine may be sequentially stored to the buffer (in the structure of a queue), and content data stored in the buffer may be sequentially read and sent to gateways (e.g., via a radio frequency signals). The content engine may schedule content data to be sent to a remote node based on the clock of the time domain comprising the remote node, in order to avoid buffer overflow or buffer starvation at the remote node. For example, the content engine may send, to the remote node, a fixed amount of content data every time the timestamp counter of the time domain increments by a predetermined amount (e.g., one (1)), and the fixed amount of content data may correspond to the amount of content data that may be read and sent by the remote node to the gateways every time the clock of the remote node increments by the predetermined amount (e.g., one (1)).

In step 651 (FIG. 6B), a determination of whether to configure backup virtual service(s) (e.g., for active virtual services implemented on a first server) may be made. Active virtual services may be currently communicating with corresponding remote nodes, and/or performing various functions. New backup virtual services may be configured if the quantity of existing backup virtual services is below a threshold (e.g., five (5)). If backup virtual service(s) are to be configured (step 651: Y), the method may proceed to step 653. In step 653, a determination of whether the first server implementing active virtual services which the backup virtual services may support has sufficient capacity to host additional virtual services as backups may be made. For example, an amount of resources (e.g., computing resources, storage resources, networking resources, etc.) that a new backup virtual service may consume may be determined, and may be compared with the amount of available resources of the first server.

If the first server has sufficient capacity to host additional virtual services as backups (step 653: Y), the method may proceed to step 655. In step 655, new backup virtual service(s) may be configured on the first server. For example, a hypervisor of the first server may configure the new backup virtual service(s). In step 657, the newly configured backup virtual service(s) may obtain time differential information associated with active virtual services they support. For example, the newly configured backup virtual service(s) may support (e.g., backup) one or more active virtual services running on the first server, and may retrieve, from the time differential table of the first server, time differentials associated with the supported active virtual services. The newly configured backup virtual service(s) may update (e.g., periodically) the time differential information it possesses (e.g., by periodically querying the time differential table of the first server).

If the first server implementing active virtual services which the backup virtual services may support does not have sufficient capacity to host additional virtual services as backups (step 653: N), the method may proceed to step 659. In step 659, a second server may be configured. For example, a second server may be initialized for hosting backup virtual services. A second server that is currently running (e.g., implementing other virtual services) may be additionally or alternatively used for hosting backup virtual services. In step 661, one or more backup virtual services may be configured on the second server (e.g., to support the active virtual services implemented on the first server). For example, a hypervisor of the second server may configure the backup virtual services on the second server. Additionally or alternatively, some backup virtual services may be configured on the first server, and some other backup virtual services may be configured on the second server.

In step 663, the newly configured backup virtual services, implemented on the second server, may obtain time differential information associated with the active virtual services they support. For example, the backup virtual services may support (e.g., backup) active virtual services running on the first server. The remote nodes connected to the active virtual services may be determined. Time differentials associated with the remote nodes may be determined based on a clock of the second server. For example, the second server and/or the backup virtual services implemented thereon may receive, from the remote nodes, timestamps associated with the remote nodes, and may calculate the time differentials based on the timestamps and the clock of the second server, in a similar manner as described in connection with FIG. 5. The time differential information of the second server and/or the backup virtual services implemented thereon may be updated (e.g., by periodically receiving timestamps from the remote nodes and determining the time differentials). Additionally or alternatively, a server with backup virtual services may store a time differential table that gathers time differentials with remote nodes associated with some or all of the virtual services that are being backed up.

If backup virtual service(s) are to not be configured (step 651: N), the method may proceed to step 665. In step 665, a determination of whether a failure of an active virtual service has been detected may be made. For example, a hypervisor of the first server may monitor the running status of each active virtual service implemented on the first server, and may detect a failure of an active virtual service. If a failure of an active virtual service has been detected (step 665: Y), the method may proceed to step 667. In step 667, a backup virtual service may be determined for performing the functions previously performed by the failed virtual service. For example, a backup virtual service may be selected from all of the backup virtual services that may support the failed virtual service.

In step 669, the selected backup virtual service may determine a time differential to be used for communicating with the remote node previously connected to the failed virtual service. The time differential may have been obtained by the selected backup virtual service (e.g., in steps 657, 663), and/or may have been updated (e.g., periodically) by the selected backup virtual service. The selected backup virtual service may use the time differential for communicating with the remote node. Obtaining and/or updating time differential information by a backup virtual service before an active virtual service fails may help reduce the amount of recovery time if the active virtual service fails. In step 671, the selected backup virtual service may establish a connection with the remote node previously associated with the failed virtual service. The selected backup virtual service may communicate with the remote node using the determined time differential.

If a failure of an active virtual service has not been detected (step 665: N), the method may proceed to step 673. In step 673, one or more degrees of clock drift may be determined (e.g., for one or more time domains comprising virtual services and remote nodes). The clock of a remote node and the clock of the server implementing a virtual service corresponding to the remote node may run at slightly different frequencies. The clock of the time domain comprising the remote node and the virtual service may be based on the clock of the server (e.g., the clock of the time domain may correspond to the clock of the server plus a time differential associated with the time domain). Accordingly, the clock of the time domain may run at a different frequency than the clock of the remote node, and may drift apart or gradually desynchronize from the clock of the remote node after some time of synchronization. Time differentials associated with time domains may, for example, be updated periodically (e.g., in step 605) to keep the clocks of the time domains and the clocks of the remote nodes synchronized.

The frequency for updating a time differential associated with a time domain may be determined based on the degree of clock drift between the clock of the time domain and the clock of the remote node. The degree of clock drift may be determined based on determined values of the time differential. For example, the time differential may be determined at a particular time (e.g., timestamp 5,000,000), and a first value of the time differential determined at the particular time may be 200,000. The time differential may be determined at another time (e.g., timestamp 6,000,000), and a second value of the time differential determined at the other time may be 200,002. It may be determined that during the time internal of 1,000,000 (e.g., 6,000,000 minus 5,000,000) the time differential may change by 2 (e.g., from 200,000 to 200,002). A degree of clock drift may be determined based on the length of the time internal and the change of the time differential. For example, the degree of clock drift may correspond to the change of the time differential divided by the length of the time interval (e.g., 2/1,000,000).

In step 675, it may be determined whether a degree of clock drift associated with a time domain satisfies (e.g., meets, exceeds, etc.) a clock drift threshold (e.g., 1/1,000). If a clock of a remote node drifts apart from a clock of a time domain associated with the remote node, the time differential associated with the time domain may be updated so that the clock of the time domain may stay synchronized with the clock of the remote node. If the clock of the remote node drifts apart from the clock of the time domain too fast and/or if the clock of the remote node runs at a much higher or lower frequency than the clock of the time domain, a server (and/or a virtual service) associated with the remote node might not be able to update its time differential (e.g., by sending and/or receiving synchronization messages to and/or from the remote node) fast enough to stay synchronized with the remote node. The clock of the remote node may be reconfigured so that the clock of the remote node may run at a similar frequency as the clock of the time domain and/or the clock of the remote node might not drift apart from the clock of the time domain too fast.

If a degree of clock drift associated with a time domain satisfies a clock drift threshold (step 675: Y), the method may proceed to step 677. In step 677, a clock of a remote node associated with the time domain may be reconfigured. For example, a clock reset command may be sent to the remote node. The clock reset command may instruct the remote node to reset the clock of the remote node. For example, based on the clock reset command, the remote node may restart the hardware (e.g., oscillator circuitry) and/or software associated with the clock of the remote node. Additionally or alternatively, a clock synchronization command may be sent to the remote node. The clock synchronization command may instruct the remote node to synchronize the clock of the remote node with, for example, a PTP master clock. The PTP master clock may, for example, run at a frequency designed to be used for the system (e.g., 10.24 MHz). Based on synchronizing with the PTP master clock, the remote node may, for example, adjust the frequency of the clock of the remote node (e.g., to approach the frequency of the clock of the time domain), so that the degree of clock drift associated with the time domain may be reduced. After the clock of the remote node is reconfigured, the time differential associated with the time domain comprising the remote node and the corresponding virtual service may be updated. For example, the remote node may send, to the virtual service and/or the server implementing the virtual service, an indication that the clock of the remote node has been reconfigured. The indication may, for example, trigger the virtual service and/or the server implementing the virtual service to update the associated time differential.

If a degree of clock drift associated with a time domain does not satisfy a clock drift threshold (step 675: N), the method may proceed to step 679. In step 679, the frequency for updating the time differential associated with the time domain may be adjusted based on the degree of clock drift associated with the time domain. For example, the adjustment may be made based on a mapping of clock drift degree to updating frequency. For example, the period for updating the time differential may be set to 2,000,000 if the clock drift degree is below 1/1,000,000, may be set to 1,000,000 if the clock drift degree is not below 1/1,000,000 and is below 2/1,000,000, and may be set to 200,000 if the clock drift degree is not below 2/1,000,000. Any other type of desired mapping may be used for adjusting the frequency for updating the time differential. Additionally or alternatively, each time domain may have its own frequency for updating its time differential. For example, each virtual service implemented on a server may update its time differential at its own frequency for updating the time differential. The steps discussed above (e.g., steps 673, 675, 677, 679) may be performed for one or more time domains of the system.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a virtual service implemented by a computing device from a node via a network, a synchronization message indicating a first timestamp associated with the node;
   determining, based on a clock associated with the computing device, a second timestamp associated with the computing device;
   determining, based on the first timestamp and the second timestamp, a time differential associated with the virtual service and the node; and
   based on the time differential, sending, by the virtual service via the node to one or more devices, one or more messages.

2. The method of claim 1, further comprising:
   storing, in a database table independent of the virtual service, the time differential, wherein the database table indicates a plurality of time differentials each associated with a virtual service paired with a node.

3. The method of claim 1, further comprising:
   configuring, based on a capacity of the computing device, a second virtual service on the computing device;
   based on detecting a failure of the virtual service, configuring the second virtual service with the time differential; and
   communicating, by the second virtual service and based on the time differential, with the node.

4. The method of claim 1, further comprising:
   configuring, based on a capacity of the computing device, a second virtual service on a second computing device; and
   determining, based on a clock associated with the second computing device, a second time differential associated with the node.

5. The method of claim 1, further comprising:
   based on detecting a failure of the virtual service, configuring a second virtual service with a second time differential; and
   communicating, by the second virtual service and based on the second time differential, with the node.

6. The method of claim 1, further comprising:
   updating, based on a frequency based on a degree of clock drift between the clock associated with the computing device and a clock associated with the node, the time differential.

7. The method of claim 6, further comprising:
   determining a second time differential associated with the virtual service and the node; and
   determining, based on the time differential and the second time differential, the degree of clock drift.

8. The method of claim 1, further comprising:
   determining, based on the clock associated with the computing device and the time differential, a third timestamp; and
   sending, to the node, a message to be modulated by the node, wherein the message indicates the third timestamp.

9. The method of claim 1, further comprising:
   determining, based on a third timestamp of the clock associated with the computing device and based on the time differential, a first value for a clock associated with the virtual service and the node, wherein the first value indicates an expected timestamp value, of a clock associated with the node, when a message sent by the virtual service at the third timestamp will be received by the node.

10. The method of claim 1, further comprising:
    scheduling, based on a clock associated with the time differential, data to be sent to the node.

11. The method of claim 1, wherein the one or more messages comprises one or more of: a message scheduling sending of content, a synchronization message, or a message allocating upstream bandwidth.

12. The method of claim 1, further comprising:
    sending, by the virtual service, one or more messages comprising one or more of:
    the time differential, or
    a time stamp based on the time differential.

13. The method of claim 1, wherein the virtual service is associated with a content delivery system, and wherein the node is configured to implement physical (PHY) layer functions of the content delivery system.

14. The method of claim 1, wherein the one or more devices comprise one or more user devices.

15. A method comprising:
    receiving, by a computing device configured to execute a plurality of virtual services from a plurality of nodes via a network, a plurality of first timestamps;
    determining, based on a clock associated with the computing device, a plurality of second timestamps;
    determining, based on the plurality of first timestamps and the plurality of second timestamps, a plurality of time differentials associated with the plurality of nodes; and
    managing, based on the plurality of time differentials, communications from the plurality of virtual services via the plurality of nodes.

16. The method of claim 15, wherein the plurality of first timestamps are based on clocks associated with the plurality of nodes.

17. The method of claim 15, further comprising:
    determining, based on a clock associated with a second computing device, a plurality of second time differentials associated with the plurality of nodes; and
    storing, in a database table of the second computing device, the plurality of second time differentials.

18. The method of claim 15, further comprising:
    based on detecting a failure of a virtual service of the plurality of virtual services, configuring a virtual service of a second computing device with a time differential associated with a node and the failed virtual service.

19. The method of claim 15, further comprising:
    based on detecting a failure of a virtual service of the plurality of virtual services, configuring a backup virtual service of the computing device with a time differential, of the plurality of time differentials, associated with a node and the failed virtual service.

20. The method of claim 15, further comprising:
    determining, based on degrees of clock drift between the clock associated with the computing device and clocks associated with the plurality of nodes, a plurality of updating frequencies associated with the plurality of nodes; and
    updating, based on the plurality of updating frequencies, the plurality of time differentials.

21. The method of claim 15, wherein the plurality of virtual services comprises a plurality of virtual cable modem termination systems (vCMTSs), and wherein the plurality of nodes comprises a plurality of remote PHY devices (RPDs).

22. The method of claim 15, wherein the managing communications comprises one or more of: sending one or more messages via the nodes, scheduling sending of content, or allocating upstream bandwidth.

23. A method comprising:
  receiving, by a virtual service implemented by a computing device and from a node, a synchronization message indicating a first timestamp associated with the node;
  determining, based on a clock associated with the computing device, a second timestamp associated with the computing device;
  determining, based on the first timestamp and the second timestamp, a time differential associated with the virtual service and the node; and
  based on the time differential, sending, to one or more additional devices via the node, one or more messages comprising one or more of:
    the time differential, or
    a time stamp based on the time differential.

24. The method of claim 23, wherein the receiving comprises receiving the synchronization message via a network.

25. The method of claim 23, further comprising updating, based on a frequency based on a degree of clock drift between the clock associated with the computing device and a clock associated with the node, the time differential.

* * * * *